(12) United States Patent
Lee et al.

(10) Patent No.: US 12,249,714 B2
(45) Date of Patent: Mar. 11, 2025

(54) POSITIVE ELECTRODE ADDITIVE, MANUFACTURING METHOD THEREOF, AND POSITIVE ELECTRODE AND LITHIUM RECHARGEABLE BATTERY INCLUDING THE SAME

(71) Applicant: LG Chem, Ltd., Seoul (KR)

(72) Inventors: Boram Lee, Daejeon (KR); Sin Young Park, Daejeon (KR); Tae Gu Yoo, Daejeon (KR); Taegon Kim, Daejeon (KR); Min Kwak, Daejeon (KR); Wang Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 743 days.

(21) Appl. No.: 17/274,860

(22) PCT Filed: Mar. 3, 2020

(86) PCT No.: PCT/KR2020/003012
§ 371 (c)(1),
(2) Date: Mar. 10, 2021

(87) PCT Pub. No.: WO2020/242021
PCT Pub. Date: Dec. 3, 2020

(65) Prior Publication Data
US 2022/0020988 A1 Jan. 20, 2022

(30) Foreign Application Priority Data

May 27, 2019 (KR) .................. 10-2019-0062076

(51) Int. Cl.
| | | |
|---|---|---|
| *H01M 4/58* | (2010.01) | |
| *C01B 25/445* | (2006.01) | |
| *C01B 25/45* | (2006.01) | |
| *C01G 53/00* | (2006.01) | |
| *C01G 53/50* | (2025.01) | |
| *H01M 4/02* | (2006.01) | |
| *H01M 4/525* | (2010.01) | |
| *H01M 10/0525* | (2010.01) | |
| *H01M 10/0567* | (2010.01) | |

(52) U.S. Cl.
CPC .......... *H01M 4/5825* (2013.01); *C01B 25/445* (2013.01); *C01B 25/45* (2013.01); *C01G 53/50* (2013.01); *H01M 4/525* (2013.01); *H01M 10/0525* (2013.01); *H01M 10/0567* (2013.01); *C01P 2006/40* (2013.01); *H01M 2004/028* (2013.01); *H01M 2220/20* (2013.01)

(58) Field of Classification Search
None
See application file for complete search history.

(56) References Cited

U.S. PATENT DOCUMENTS

| | | |
|---|---|---|
| 5,759,719 A | 6/1998 | Mao |
| 2004/0157124 A1 | 8/2004 | Goh et al. |
| 2011/0076564 A1 | 3/2011 | Yu et al. |
| 2012/0164533 A1 | 6/2012 | Senoue et al. |
| 2015/0340692 A1 | 11/2015 | Park et al. |
| 2016/0133933 A1 | 5/2016 | Choi et al. |
| 2016/0197346 A1 | 7/2016 | Myung et al. |
| 2017/0179484 A1 | 6/2017 | Park et al. |
| 2020/0075957 A1 | 3/2020 | Jeon et al. |
| 2020/0176754 A1 | 6/2020 | Lho et al. |
| 2020/0266447 A1 | 8/2020 | Kim et al. |

FOREIGN PATENT DOCUMENTS

| | | | |
|---|---|---|---|
| CN | 1518777 | A | 8/2004 |
| CN | 104781961 | A | 7/2015 |
| CN | 105247715 | A | 1/2016 |
| CN | 107516733 | A | 12/2017 |
| CN | 110416537 | | * 11/2019 |
| JP | H09-241026 | A | 9/1997 |
| JP | 2000502831 | A | 3/2000 |
| JP | 2006514776 | A | 5/2006 |
| JP | 2010055777 | A | 3/2010 |
| JP | 2012142156 | A | 7/2012 |
| JP | 2012-221681 | A | 11/2012 |
| JP | 2014055085 | A | 3/2014 |
| JP | 2014-182885 | A | 9/2014 |

(Continued)

OTHER PUBLICATIONS

Machine translation of CN 110416537, published on Nov. 5, 2019 (Year: 2019).*
Bish D.L. & Howard C.J., "Quantitative phase analysis using the Rietveld method" J. Appl. Cryst., 21, 86-91, 1988.
International Search Report for Application No. PCT/KR2020/003012, dated Jun. 30, 2020, 3 pages.
Rietveld, H.M.L "Line Profiles of Neutron Powder-diffraction Peaks for Structure Refinement" Axta. Cryst., 22, 151-2, 1967.
Extended European Search Report for Application No. 20815412.0, dated Sep. 16, 2021, 6 pages.
Komaba S et al: "Influence of manganese(II), cobalt(II), and nickel(II) additives in electrolyte on performance of graphite anode for lithium-ion batteries", Electrochimica Acta, Elsevier, Amsterdam, NL, vol. 47, No. 8, pp. 1229-1239, Feb. 1, 2002 (Feb. 1, 2002).

*Primary Examiner* — Anca Eoff
(74) *Attorney, Agent, or Firm* — Lerner David LLP (57) ABSTRACT

The present disclosure relates to a positive electrode additive, a manufacturing method thereof, and a positive electrode and a lithium rechargeable battery including the same. Specifically, one embodiment of the present disclosure provides a positive electrode additive for a lithium rechargeable battery comprising: a compound represented by the following Chemical Formula 1; a compound represented by the following Chemical Formula 2; and lithium phosphate (Li$_3$PO$_4$):

$$Li_{2+a}Ni_bM_{1-b}O_{2+c} \quad \text{[Chemical Formula 1]}$$

wherein, M is a metal element forming a divalent cation, $-0.2 \le a \le 0.2$, $0.5 \le b \le 1.0$, and $-0.2 \le c \le 0.2$, $$Ni_{2-e}M_{1-e}P_4O_{12} \quad \text{[Chemical Formula 2]}$$

wherein, $0.5 \le e \le 1.0$, and M is the same as defined in Chemical Formula 1.

14 Claims, 5 Drawing Sheets

(56) References Cited

FOREIGN PATENT DOCUMENTS

| | | |
|---|---|---|
| JP | 2015138730 A | 7/2015 |
| JP | 2020518967 A | 6/2020 |
| JP | 2020522851 A | 7/2020 |
| KR | 100614368 B1 | 8/2006 |
| KR | 20150018752 A | 2/2015 |
| KR | 20150048410 A | 5/2015 |
| KR | 20160026402 A | 3/2016 |
| KR | 20170071945 A | 6/2017 |
| KR | 20190011132 A | 2/2019 |
| KR | 20190056997 A | 5/2019 |
| WO | 2005031892 A2 | 4/2005 |
| WO | 2015072093 A1 | 5/2015 |
| WO | 2019-065151 A1 | 4/2019 |
| WO | 2019103576 A2 | 5/2019 |

\* cited by examiner

POSITIVE ELECTRODE ADDITIVE, MANUFACTURING METHOD THEREOF, AND POSITIVE ELECTRODE AND LITHIUM RECHARGEABLE BATTERY INCLUDING THE SAME

CROSS-REFERENCE TO RELATED APPLICATIONS

The present application is a national phase entry under 35 U.S.C. § 371 of International Application No. PCT/KR2020/003012 filed Mar. 3, 2020, which claims priority from Korean Patent Application No. 10-2019-0062076 filed on May 27, 2019, all of which are incorporated herein by reference in their entirety.

TECHNICAL FIELD

The present disclosure relates to a positive electrode additive, a manufacturing method thereof, and a positive electrode and a lithium rechargeable battery including the same.

BACKGROUND ART

In a lithium rechargeable battery, electrode active materials capable of reversibly intercalating and de-intercalating lithium ions are applied to each of a negative electrode and a positive electrode, migration of lithium ions through an electrolyte is implemented, and electrical energy is generated through oxidation-reduction reactions at each electrode.

By the way, during the first charge-discharge cycle of the lithium rechargeable battery, lithium ion that is deintercalated (battery discharge) after being intercalated into the negative electrode (battery charge), and lithium ion that cannot be recovered again (battery discharge) after being deintercalated from the positive electrode (battery charge) are inevitably generated, respectively. This is associated with the irreversible capacity of the two electrodes.

The greater the irreversible capacity difference between the two electrodes, the lower the initial efficiency of the positive electrode. During battery driving, the energy density may be gradually reduced, and the battery life may be reduced.

DETAILED DESCRIPTION OF THE PRESENT DISCLOSURE

Technical Problem

An embodiment of the present disclosure provides a positive electrode additive which does not cause a side reaction with the electrolyte, and can further contribute to stabilizing the negative electrode surface, while effectively offsetting initial irreversible capacities of the positive electrode and the negative electrode in the lithium ion battery.

Another embodiment of the present disclosure provides a method for manufacturing the positive electrode additive of the one embodiment under specific conditions.

Technical Solution

Advantages and features of the present disclosure, and methods of achieving them will be apparent from embodiments that will be described in detail below. However, the present disclosure is not limited to embodiments that will be disclosed below, but may be implemented in various different forms. These embodiments are merely provided to make the present disclosure complete and to make those having ordinary knowledge in the art to which the present disclosure pertains completely understand the scope of the present disclosure. The present disclosure is defined only by the scope of the claims.

Unless otherwise defined herein, all terms including technical or scientific terms used herein have the same meanings as commonly understood by those skilled in the art to which the present disclosure pertains. Further, repeated descriptions of the same technical configurations and operations as in the prior art are omitted for clarity.

Throughout the specification, the term "connected to" or "coupled to" that is used to designate a connection or coupling of one element to another element includes both a case that an element is "directly connected or coupled to" another element and a case that an element is "electronically connected or coupled to" another element via still another element.

Throughout the specification, the term "on" that is used to designate a position of one element with respect to another element includes both a case that the one element is adjacent to the other element and a case that any other element exists between these two elements.

Throughout the specification, when a part is referred to as"including" a certain component, it means that it can further include other components, without excluding the other components, unless otherwise stated.

The term "about or approximately" or "substantially" used herein is intended to have meanings close to numerical values or ranges specified with an allowable error and intended to prevent accurate or absolute numerical values disclosed for understanding of the present disclosure from being illegally or unfairly used by any unconscionable third party.

Further, throughout the specification, the term "step of" does not mean "step for".

Throughout the specification, the term "combination(s) thereof" included in Markush type description means mixture or combination of one or more selected from a group consisting of components described in Markush type and thereby means including one or more selected from a group consisting of the components.

Throughout the specification, a phrase in the form "A and/or B" means "A or B, or A and B".

Positive Electrode Additive

In one embodiment of the present disclosure, there is provided a positive electrode additive for a lithium rechargeable battery comprising: a compound represented by the following Chemical Formula 1; a compound represented by the following Chemical Formula 2; and lithium phosphate ($Li_3PO_4$):

[Chemical Formula 1]

wherein, M is a metal element forming a divalent cation, $-0.2 \leq a \leq 0.2$, $0.5 \leq b \leq 1.0$, and $-0.2 \leq c \leq 0.2$,

[Chemical Formula 2]

wherein, $0.5 \leq e \leq 1.0$, and M is the same as defined in Chemical Formula 1.

Since the compound represented by Chemical Formula 1 contains an excess of lithium compared to a conventional positive electrode active material having a level of 1 mol, it can discharge lithium earlier than the positive electrode active material during the initial charging of the lithium rechargeable battery, and offset irreversible capacities of the positive electrode and the negative electrode, and may provide a positive electrode additive that increases the initial charging capacity.

Although more detailed matters will be set forth below, the compound represented by Chemical Formula 1 can be prepared by mixing a lithium raw material (e.g., $Li_2O$) and a nickel raw material (e.g., $Ni_dM_{1-d}O$) according to a stoichiometric molar ratio of Chemical Formula 1 and then heat-treating the mixture.

A large number of unreacted raw materials may be present on the surface of the compound represented by Chemical Formula 1 prepared using only the lithium raw material and the nickel raw material. Among them, when lithium raw materials come into contact with air or moisture, lithium by-products such as LiOH and $Li_2CO_3$ can be produced, and when the lithium by-products come into contact with an electrolyte in the battery, HF gas or the like may be generated, which may cause battery deterioration.

By the way, the lithium by-products not only do not participate in the electrochemical reaction in the battery, but also generate a gas in the battery, which cause a problem that the initial capacity, initial charge and discharge efficiency of the battery are reduced.

In this regard, washing treatment for removing unreacted raw materials is also one method, but lithium and the like may be eluted from the compound represented by Chemical Formula 1 in the washing process, rather there is a possibility that by-products increase again during the drying process after washing, and there is also a limitation in removing the lithium by-products due to re-contamination after washing.

Therefore, in one embodiment, unreacted raw materials are reacted with a phosphorus raw material instead of the washing treatment, thereby converting into the compound represented by Chemical Formula 2; and the lithium phosphate ($Li_3PO_4$).

The compound represented by Chemical Formula 2 is a reaction product of the unreacted nickel raw material and the phosphorus raw material, and also is a reaction product of the unreacted lithium raw material and the phosphorus raw material, both of which may not produce lithium by-products.

Meanwhile, the compound represented by Chemical Formula 2 may be dissolved in an electrolyte in a battery, and can be reduced at the surface of the negative electrode during charging formation of the battery, thereby forming a Ni layer, which does not degrade the electrochemical performance of the battery, but rather can contribute to improvement in stability.

However, the conditions for manufacturing the positive electrode additive of the one embodiment need to be particularly controlled.

According to an experimental example described below, the lithium raw material, the nickel raw material, and the phosphorus raw material are mixed collectively, and then heat-treated at a temperature in the range of 600 to 900° C. In this process, it is confirmed that the positive electrode additive is manufactured only when an inert gas is supplied.

Here, the collective mixing of the raw materials (the number of heat treatments), the heat treatment temperature, the supply state of inert gas during heat treatment, and the supply flow rate thereof must all satisfy the above-mentioned conditions.

If even any of the above factors is not controlled, the compound represented by Chemical Formula 2 may not be produced. If even any of the above factors is not controlled, an additive containing a compound represented by Chemical Formula 1; and the lithium phosphate ($Li_3PO_4$) can be produced, but the positive electrode additive of one embodiment including the compound represented by Chemical Formula 1; the compound represented by Chemical Formula 2; and lithium phosphate ($Li_3PO_4$) cannot be produced.

Details of the manufacturing conditions will be described later, and in the following, the configuration of the positive electrode additive of the one embodiment, manufactured by controlling the manufacturing conditions, will be described in detail.

Structure

The positive electrode additive of the one embodiment can have a structure consisting of a first phase secondary particle; and a second phase particle located on the surface thereof. Here, the "particle" in the second phase particle may be a primary particle or a secondary particle in which the primary particles are agglomerated.

Specifically, the compound represented by Chemical Formula 1 forms the first phase secondary particle, and the lithium phosphate is the second phase particle which may be attached to the surface of the secondary particle.

In the case of the compound represented by Chemical Formula 2, it may be distributed on the surface, inside, or both of the secondary particle.

Constituent Component and Content of each Component

Meanwhile, the positive electrode additive of the one embodiment may further include the compound represented by Chemical Formula 1; the compound represented by Chemical Formula 2; and lithium phosphate ($Li_3PO_4$); as well as $Li_2O$ and NiO. The form of existence thereof is not particularly limited. For example, the positive electrode additive is in the form of a composite in which the NiO particles and $Li_2O$ particles are attached onto the surface of the particles represented by Chemical Formula 1, or may be in the form of a mixture in which the NiO particles and the $Li_2O$ particles are present separately from the particles of the compound represented by Chemical Formula 1.

These may correspond to the compound represented by Chemical Formula 2; and unreacted raw material that has not yet been converted to the lithium phosphate ($Li_3PO_4$), in the process of manufacturing the positive electrode additive of the one embodiment.

Among them, $Li_2O$ may be a factor for producing lithium by-products as described above, but excess Li can be provided to the positive electrode together with the compound represented by Chemical Formula 1, and the initial charging capacity of the positive electrode can be further increased, so it may not be particularly removed.

Based on the total amount (100% by weight) of the positive electrode additive, the compound represented by Chemical Formula 1 may be contained in an amount of 80 to 90% by weight, the $Li_3PO_4$ may be contained in an amount of 2 to 5% by weight, the NiO may be contained in an amount of 5 to 15% by weight, and the $Li_2O$ and the compound represented by Chemical Formula 2 may correspond to the balance.

Specifically, the compound represented by Chemical Formula 1; the lithium phosphate ($Li_3PO_4$); the $Li_2O$ and the NiO are each crystalline and can be detected by X-Ray Diffraction (XRD) with Cu Kα X-rays (X-rα).

In other words, when qualitative and quantitative analysis of the core is performed using X-Ray Diffraction (XRD) by Cu Kα X-rays (X-rα), not only the presence or absence of each of the lithium phosphate ($Li_3PO_4$); the $Li_2O$ and the NiO, but also the amount of existence thereof can be confirmed.

In the experimental example described below, the results of X-ray diffraction analysis of the respective positive electrode additives were qualitatively analyzed using Bruker's Evaluation program to confirm the corresponding peaks for $Li_2NiO_2$, $Li_3PO_4$, $Li_2O$ and NiO. For these corresponding peaks, quantitative analysis between two phases was performed by Rietveld refinement using TOPAS program (Bruker-AXS, TOPAS4, Karlsruhe, Germany). Rietveld refinement is a feedback process that repetitively adjusts the variables capable of using until the measured X-ray diffraction pattern and the pattern calculated from each structural model of $Li_2NiO_2$, $Li_3PO_4$, $Li_2O$ and NiO match best. In this process, not only the position of the diffraction peak, but also the intensity and intensity ratio of the peak were analyzed and the contents of the two phases were quantitatively analyzed (see, Rietveld, HML "Line Profiles of Neutron Powder-diffraction Peaks for Structure Refinement" Axta. Cryst., 22, 151-2, 1967 and Bish D L & Howard C J, "Quantitative phase analysis using the Rietveld method" J. Appl. Cryst., 21, 86-81, 1988).

Meanwhile, the compound represented by Chemical Formula 2 is also crystalline, but the amount is very small compared to other components. Thus, it may be difficult to detect it during XRD analysis of the positive electrode additive itself. However, in the experimental example described below, only the nickel raw material and the phosphorus raw material are mixed and heat-treated, and then subjected to XRD analysis. As a result, the compound represented by Chemical Formula 2 was detected, through which it can be inferred that even in the positive electrode additive, the compound represented by Chemical Formula 2 is contained even if the amount is very small.

Furthermore, considering that a nickel metal layer is detected on the surface of the negative electrode separated after charging formation of the lithium rechargeable battery to which the positive electrode active material is applied, it can be inferred that the compound represented by Chemical Formula 2 is contained in the positive electrode active material, and this material is dissolved in an electrolyte and then reduced to nickel metal on the surface of the negative electrode in the process of charging formation of the battery.

Method for Manufacturing Positive Electrode Additive

In another embodiment of the present disclosure, there is provided a method for manufacturing a positive electrode additive for a lithium rechargeable battery comprising the steps of: preparing a raw material mixture containing a lithium raw material, a nickel raw material, and a phosphorus raw material; and heat-treating the raw material mixture at a temperature in the range of 600 to 900° C. in a reactor to which an inert gas is supplied.

Here, only when collective mixing of raw materials (the number of heat treatments), the heat treatment temperature, the supply state of an inert gas during heat treatment and the supply flow rates all satisfy the above-suggested conditions, the positive electrode additive of the above-mentioned one embodiment can be finally obtained.

If the raw materials are not mixed collectively, a process may be considered in which only the lithium raw material and the nickel raw material are mixed and heat-treated to produce the compound represented by Chemical Formula 1, which is then mixed with the phosphorus raw material and subjected to heat treatment. However, in the process of applying the heat treatment twice in this way, the compound represented by Chemical Formula 1 can be decomposed and then re-synthesized, whereby even if the compound represented by Chemical Formula 2 is not produced or is produced, the amount may be merely very small. The production amount of the compound represented by Chemical Formula 1 may also be reduced.

In addition, even when the heat treatment is performed under the conditions where the heat treatment temperature is higher than 900° C., or the flow rate is less than 1.5 L/min even if the inert gas is not supplied or is supplied, the compound represented by Chemical Formula 1 that is structurally unstable may be decomposed and then re-synthesized, whereby even if the compound represented by Chemical Formula 2 is not produced or is produced, the amount may merely very small, and the production amount of the compound represented by Chemical Formula 1 may also be reduced.

Hereinafter, the contents overlapping with those described above will be omitted, and the manufacturing method of the one embodiment will be described in detail.

Raw Material

In the raw material mixture, the phosphorus raw material may be contained in an amount of 1 to 10% by weight, specifically 2 to 8% by weight, for example, 3 to 7% by weight, based on the total amount (100% by weight) of the raw material mixture. Further, in the case of the lithium raw material and the nickel raw material, the molar ratio of lithium (Li):nickel (Ni) constituting them may be 3:1 to 3:2. This suggests an adjustable range, theoretically considering the molar ratio of Li:Ni in Chemical Formula 1 of 2:1, but considering that raw materials do not react in the actual production process or there are many cases of being disappeared. Therefore, the above range is merely one example, and may be appropriately adjusted in consideration of theory and practice.

The phosphorus raw material may include secondary ammonium phosphate (($NH_4$)$_2HPO_4$), primary ammonium phosphate ($NH_4H_2PO_4$), or a mixture thereof, the lithium raw material may include $Li_2O$, LiOH, or a mixture thereof, and the nickel raw material may include a compound represented by the following Chemical Formula 3:

$$(Ni_dM_{1-d})O \qquad \text{[Chemical Formula 3]}$$

wherein, M is a metal element forming a divalent cation, and $0 \leq d \leq 0.5$.

Heat Treatment

In the heat treatment step, the inert gas may include nitrogen ($N_2$) gas, which may be supplied to the reactor at a flow rate of 1.5 to 2.5 L/min.

Specifically, in the reactor to which the inert gas is supplied, the step of heat-treating the raw material mixture at a temperature in the range of 600 to 900° C. may be performed by the following steps.

a) reacting the lithium raw material and the nickel raw material to produce a compound represented by the following Chemical Formula 1;

b) reacting the nickel raw material that has not reacted in step a) with the phosphorous raw material to produce a compound represented by the following Chemical Formula 2;

c) reacting the lithium raw material that has not reacted in step a) with the phosphorus raw material that has not reacted in step b) to produce lithium phosphate ($Li_3PO_4$); and d) obtaining a positive electrode additive including the compound represented by Chemical Formula 1 produced in step a), the compound represented by Chemical Formula 2 produced in step b), and the lithium phosphate ($Li_3PO_4$) produced in step c):

$$Li_{2+a}Ni_bM_{1-b}O_{2+c} \qquad \text{[Chemical Formula 1]}$$

wherein, M is a metal element forming a divalent cation, −0.2≤a≤0.2, 0.5≤b≤1.0 and −0.2≤c≤0.2, $$Ni_{2-e}M_{1-e}P_4O_{12} \quad \text{[Chemical Formula 2]}$$

wherein, 0.5≤e≤1.0, and M is the same as defined in Chemical Formula 1.

In the positive electrode additive obtained in step d), a lithium raw material, a nickel raw material, or a mixture thereof which have not reacted in a) to c) may also be included, and details thereof are as described above.

Meanwhile, in step b), $Ni_3P_2O_8$ can also be produced while the compound represented by Chemical Formula 2 is produced. This may also be included in the positive electrode additive obtained in step d), but the one embodiment is not limited thereto.

At this time, the heat treatment may be preferably performed in the above temperature range for 5 to 11 hours, and more specifically, for 8 to 10 hours.

If the heat treatment is performed for a very short time beyond the above range, a sufficient reaction is not performed. If the heat treatment is performed for a very long time, the compounds represented by Chemical Formula 1 that are structurally unstable are decomposed and re-synthesized, and in that process, the compounds represented by Chemical Formula 2 may not be produced.

Positive Electrode Mixture, Positive Electrode, and Lithium Rechargeable Battery In yet another embodiment of the present disclosure, there is provided a positive electrode mixture, a positive electrode and a lithium rechargeable battery including the above-mentioned positive electrode additive.

The above-mentioned positive electrode additive may be applied to a conventional positive electrode mixture in the art. When a positive electrode manufactured from such a positive electrode mixture is produced and constituent components such as a negative electrode and an electrolyte are combined to realize into a lithium rechargeable battery, not only the initial irreversible capacity of the positive electrode and the negative electrode are effectively offset and gas generation is suppressed, but also the negative electrode surface can be stabilized by a Ni layer.

In the experimental example described below, in order to confirm the effect of the Ni layer formed on the surface of the negative electrode by the positive electrode additive of the one embodiment, a positive electrode mixture containing a positive electrode additive, a conductive material, and a binder was also prepared without allowing the positive electrode active material to be extremely included in the positive electrode mixture (Examples 1 to 3).

Even if the positive electrode additive of the one embodiment is applied with any positive electrode active material and negative electrode active material, during charging formation of the battery, the compound represented by Chemical Formula 2 can be dissolved in an electrolyte containing a lithium salt and an organic solvent, and reduced to a Ni metal on the surface of the negative electrode.

Conditions for forming and charging the lithium rechargeable battery to which the positive electrode additive is applied, the positive electrode active material and the negative electrode active material applied together with the positive electrode additive are not particularly limited. However, in the experimental example described below, when a positive electrode active material was not used or was used, a so-called NCM-based positive electrode active material was used, and the conditions for forming and charging up to 4.2 V were employed by using graphite as the negative electrode active material.

As a result, it was confirmed that 200 to 4000 ppm of Ni metal was detected from the separated negative electrode surface. This is a numerical value ranging from 2 to 2000 times in comparison with a case where the Ni metal detected under the same conditions is less than 100 ppm, when even any of the factors to be limited for producing the positive electrode additive of the above embodiment, that is, the collective mixing of the raw materials (the number of heat treatments), the heat treatment temperature, the supply state of inert gas during heat treatment, and the supply flow rate, etc., is not satisfied.

As such, it was confirmed in the experimental examples described below that the Ni metal reduced on the surface of the negative electrode can stably drive the battery, without degrading the electrochemical performance of the battery and rather by stabilizing the surface of the negative electrode.

Meanwhile, the positive electrode additive of the one embodiment may be manufactured as a positive electrode mixture together with a positive electrode active material (Example 4). At this time, the weight ratio of the positive electrode additive and the positive electrode active material of the one embodiment may be 1:99 to 35:65, and the content of the Ni layer formed on the surface of the negative electrode may also be reduced in proportion to the mixing ratio thereof.

Specifically, when not allowing the positive electrode active material to extremely include in the positive electrode mixture, the detection amount of Ni is 3000 to 4000 ppm, but when the positive electrode active material is included in a weight ratio of the positive electrode additive: positive electrode active material=10:90, Ni of level of 200 to 3000 ppm can be detected. This is also the range that can be predicted by the formula: (3000 to 4000 ppm)*(positive electrode additive)/(positive electrode additive+positive electrode active material).

In the lithium rechargeable battery of the one embodiment, matters other than the positive electrode additive and positive electrode mixture described above can be generally implemented according to matters known in the art.

Hereinafter, matters generally known in the art will be briefly presented, but this is merely an example, and the positive electrode mixture of the one embodiment is not limited thereby.

The positive electrode active material is not particularly limited as long as it is a material capable of reversibly intercalating and de-intercalating lithium ions. For example, it may include one or more of complex oxides of cobalt, manganese, nickel, or a combination of metals; and lithium.

In a more specific example, a compound represented by any of the following chemical formulas can be used as the positive electrode active material. $Li_aA_{1-b}R_bD_2$ (wherein, 0.90≤a≤1.8 and 0≤b≤0.5); $Li_aE_{1-b}R_bO_{2-c}D_c$ (wherein, 0.90≤a≤1.8, 0≤b≤0.5, and 0≤c≤0.05); $LiE_{2-b}R_bO_{4-c}D_c$ (wherein, 0≤b≤0.5, and 0≤c≤0.05); $Li_aNi_{1-b-c}Co_bR_cD_\alpha$ (wherein, 0.90≤a≤1.8, 0≤b≤0.5, 0≤c≤0.05 and 0<α≤2); $Li_aNi_{1-b-c}Co_bR_cO_{2-\alpha}Z_\alpha$ (wherein, 0.90≤a≤1.8, 0≤c≤0.05 and 0<α<2); $Li_aNi_{1-b-c}Co_bR_cO_{2-\alpha}Z_2$ (wherein, 0.90≤a≤1.8, 0≤b≤0.5, 0≤c≤0.05 and 0<α<2); $Li_aNi_{1-b-c}Mn_bR_cD_\alpha$ (wherein, 0.90≤a≤1.8, 0≤b≤0.5, 0≤c≤0.05 and 0<α≤2); $Li_aNi_{1-b-c}Mn_bR_cO_{2-\alpha}Z_\alpha$ (wherein, 0.90≤a≤1.8, 0≤b≤0.5, 0≤c≤0.05 and 0<α<2); $Li_aNi_{1-b-c}Mn_bR_cO_{2-\alpha}Z_2$ (wherein, 0.90≤a≤1.8, 0≤b≤0.5, 0≤c≤0.05 and 0<α<2); $Li_aNi_bE_cG_dO_2$ (wherein, 0.90≤a≤1.8, 0≤b≤0.9, 0≤c≤0.5 and 0.001≤d≤0.1); $Li_aNi_bCo_cMn_dGeO_2$ (wherein, 0.90≤a≤1.8, 0≤b≤0.9, 0≤c≤0.5, 0≤d≤0.5 and 0.001≤e≤0.1); $Li_aNiG_bO_2$ (wherein, 0.90≤a≤1.8 and $0.001 \leq b \leq 0.1$); $Li_aCoG_bO_2$ (wherein, $0.90 \leq a \leq 1.8$ and $0.001 \leq b \leq 0.1$); $Li_aMnG_bO_2$ (wherein, $0.90 \leq a \leq 1.8$ and $0.001 \leq b \leq 0.1$); $Li_aMn_2G_bO_4$ (wherein, $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$.

In the above chemical formulas, A is Ni, Co, Mn or a combination thereof; R is Al, Ni, Co, Mn, Cr, Fe, Mg, Sr, V, a rare earth element or a combination thereof; D is O, F, S, P or a combination thereof; E is Co, Mn or a combination thereof; Z is F, S, P or a combination thereof; G is Al, Cr, Mn, Fe, Mg, La, Ce, Sr, V or a combination thereof; Q is Ti, Mo, Mn or a combination thereof; T is Cr, V, Fe, Sc, Y or a combination thereof; and J is V, Cr, Mn, Co, Ni, Cu or a combination thereof.

Of course, it is also possible to use one having a coating layer on the surface of the above-mentioned compound, or it is possible to use a mixture of the above-mentioned compound with a compound having a coating layer. The coating layer may include a coating element compound such as coating element oxide, hydroxide, coating element oxyhydroxide, coating element oxycarbonate or coating element hydroxycarbonate. The compounds forming these coating layers may be amorphous or crystalline. As a coating element included in the coating layer, Mg, Al, Co, K, Na, Ca, Si, Ti, V, Sn, Ge, Ga, B, As, Zr or a mixture thereof can be used. As the coating layer forming process, any coating method can be used as long as it can be coated by a method (e.g., spray coating or dipping method, etc.) that does not adversely affect the physical properties of the positive electrode active material by using these elements in the compound. Since this is a content that can be well understood by those engaged in this field, and thus, detailed descriptions thereof will be omitted.

The positive electrode mixture of the one embodiment may further include a conductive material, a binder, or a mixture thereof. The conductive material is used to impart conductivity to the electrode, and any material can be used as long as it is an electronically conductive material without causing a chemical change in the battery. As examples thereof, natural graphite, artificial graphite, carbon black, acetylene black, ketjen black, carbon fiber, metal powder such as copper, nickel, aluminum, silver, metal fibers, and the like can be used. Further, one or more conductive materials such as polyphenylene derivatives may be mixed and used.

The binder serves to attach the positive electrode active material particles to each other well, and also to attach the positive electrode active material to the current collector well. As typical example thereof, polyvinyl alcohol, carboxymethyl cellulose, hydroxypropylcellulose, diacetylcellulose, polyvinyl chloride, carboxylated polyvinyl chloride, polyvinyl fluoride, polymer containing ethylene oxide, polyvinylpyrrolidone, polyurethane, polytetrafluoroethylene, polyvinylidene fluoride, polyethylene, polypropylene, styrene-butadiene rubber, acrylate-butadiene rubber, epoxy resin, nylon, etc. but is not limited thereto.

The positive electrode includes a positive electrode current collector; and a positive electrode mixture layer positioned on the positive electrode current collector and including the above-mentioned positive electrode mixture.

Specifically, the positive electrode can be manufactured by coating a mixture of a positive electrode active material, a conductive material, and a binder onto a positive electrode current collector and then drying the mixture, and if necessary, a filler may be further added to the mixture.

The positive electrode current collector is typically formed to a thickness of 3 to 500 μm. The positive electrode current collector is not particularly limited as long as a corresponding battery has high conductivity without causing a chemical change in the battery, and for example, may be formed of stainless steel, aluminum, nickel, titanium, baked carbon, or aluminum, or a material formed by surface-treating a surface of stainless steel with carbon, nickel, titanium, silver, or the like. The current collector may have fine protrusions and depressions formed on a surface thereof to enhance adherence of a positive electrode active material, and may be formed in various forms such as a film, a sheet, a foil, a net, a porous body, a foaming body, and a non-woven fabric structure.

The conductive material is typically added in an amount of 1 to 50% by weight based on the total weight of the mixture containing the positive electrode active material. The conductive material is not particularly limited as long as a corresponding battery has high conductivity without causing a chemical change in the battery, and for example, graphite such as natural graphite and artificial graphite; carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives may be used.

Meanwhile, the graphite-based material having elasticity may be used as a conductive material, or may be used together with the above-mentioned materials.

The binder is a component that assists in the binding between the active material and the conductive material and in the binding with the current collector, wherein the binder may typically be added in an amount of 1 to 50% by weight based on the total weight of the mixture containing the positive electrode material. Examples of the binder may be polyvinylidene fluoride, polyvinyl alcohol, carboxymethyl-cellulose (CMC), starch, hydroxypropylcellulose, regenerated cellulose, polyvinylpyrrolidone, polytetrafluoroethylene, polyethylene, polypropylene, an ethylene-propylene-diene terpolymer (EPDM), a sulfonated EPDM, a styrene-butadiene rubber, a fluorine rubber, various copolymers thereof, and the like.

The filler may be optionally used as a component for suppressing expansion of a positive electrode, and is not particularly limited as long as the filler is a fibrous material without causing a chemical change in the battery. For example, olefinic polymers such as polyethylene and polypropylene, and fibrous materials such as glass fibers and carbon fibers are used.

The negative electrode includes a current collector and a negative electrode active material layer formed on the current collector, and the negative electrode active material layer may include a negative electrode active material.

As the negative electrode active material, at least one or more negative electrode active materials selected from the group including carbon-based negative electrode active material, lithium metal, lithium metal alloy, Si, $SiO_x$ ($0<x<2$), Si—C composite, Si-Q alloy (where Q is an alkali metal, alkaline earth metal, Group 13 to 16 elements, transition metal, rare earth element, or a combination thereof, but is not Si), Sn, $SnO_2$, Sn—C composite, and Sn—R (where R is an alkali metal, alkaline earth metal, Group 13 to 16 elements, transition metal, rare earth element, or a combination thereof, but is not Sn) can be used.

The negative electrode current collector is typically formed to a thickness of 3 to 500 μm. The negative electrode current collector is not particularly limited as long as a corresponding battery has high conductivity without causing a chemical change in the battery, and for example, may be formed of copper, stainless steel, aluminum, nickel, titanium, or baked carbon, or a material formed by surface-treating g a surface of copper or stainless steel with carbon, nickel, titanium, silver, or the like, or may use an aluminum-cadmium alloy or the like. In addition, similar to the positive electrode current collector, the negative electrode current collector may have fine protrusions and depressions formed on a surface thereof to enhance adherence of a negative electrode active material, and may be formed in various forms such as a film, a sheet, a foil, a net, a porous body, a foaming body, and a non-woven fabric structure.

The lithium rechargeable battery of the one embodiment may be a lithium ion battery, a lithium ion polymer battery, or a lithium polymer battery, depending on the type of electrolyte and/or the type of separator.

When the lithium rechargeable battery of the one embodiment is a lithium ion battery to which a liquid electrolyte is applied, it may be applied by impregnating the liquid electrolyte into a separator. The separator is interposed between the negative electrode and the positive electrode, and an insulating thin film having high ion permeability and mechanical strength is used. The separator typically has a pore diameter of 0.01 to 10 μm and a thickness of 5 to 300 μm. As the separator, sheets or non-woven fabrics made of an olefin-based polymer such as polypropylene; glass fiber or polyethylene, which have chemical resistance and hydrophobicity, are used. When a solid electrolyte such as a polymer is employed as the electrolyte, the solid electrolyte may also serve as both the separator and electrolyte.

The liquid electrolyte may be a lithium salt-containing non-aqueous electrolyte. The lithium salt-containing non-aqueous electrolyte is composed of a non-aqueous electrolyte and lithium. As the non-aqueous electrolyte, a non-aqueous organic solvent, an organic solid electrolyte, an inorganic solid electrolyte, and the like are used, but are not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte. The lithium salt may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, for the purpose of improving charge and discharge characteristics, flame retardancy and the like, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the lithium salt-containing non-aqueous electrolyte. In some cases, in order to impart incombustibility, the electrolyte may further include halogen-containing solvents, such as carbon tetrachloride and ethylene trifluoride. Furthermore, in order to improve high-temperature retention characteristics, the electrolyte may further include carbon dioxide gas. In addition, it may further include fluoroethylene carbonate (FEC), propene sultone (PRS), and the like.

In one specific example, lithium salts such as $LiPF_6$, $LiClO_4$, $LiBF_4$ and $LiN(SO_2CF_3)_2$ are added to a mixed solvent of a cyclic carbonate of EC or PC as an highly dielectric solvent and a linear carbonate of DEC, DMC or EMC as a low-viscosity solvent to prepare a lithium salt-containing non-aqueous electrolyte.

The lithium rechargeable battery according to the one embodiment may be implemented into a battery module including the same as a unit cell, a battery pack including the battery module, and a device including the battery pack as a power source.

At this time, specific examples of the device include, but are not limited to, electric vehicles (EVs), hybrid electric vehicles (HEVs), and plug-in hybrid electric vehicles (PHEVs); or systems for storing power.

BRIEF DESCRIPTION OF THE DRAWINGS

FIG. 2b is an EDS image of a specific portion in FIG. 2a.

FIGS. 3b and 3c are EDS images of specific parts in FIG. 3a.

DETAILED DESCRIPTION OF THE EMBODIMENTS

Hereinafter, the present disclosure will be described in more detail with reference to examples, but these examples are provided for illustrative purposes only, and should not be construed as limiting the scope and spirit of the present disclosure.\

Example 1

(1) Manufacture of Positive Electrode Additive $Li_2O$, NiO, and $(NH_4)_2HPO_4$ were mixed to prepare a raw material mixture.

However, the $Li_2O$ and the NiO were mixed at a molar ratio of 1:1 such that the molar ratio of Li:Ni in the raw material mixture was 2:1, and the $(NH_4)_2HPO_4$ was set to 5 wt % based on the total amount (100 wt %) of the raw material mixture.

The raw material mixture was heat-treated at 680° C. for 10 hours under the conditions where nitrogen gas, which is a kind of inert gas, was introduced at 2 L/min, to obtain a positive electrode additive of Example 1.

(2) Manufacture of Positive Electrode and Lithium Rechargeable Battery (Coin Full-Cell)

The positive electrode additive of Example 1, a conductive material (Super-P, Denka Black) and a binder (PVdF) were mixed at a weight ratio of 97:2:1 (positive electrode additive: conductive material: binder) in an organic solvent to manufacture a positive electrode mixture in a slurry form. Then, the positive electrode mixture was coated onto an aluminum current collector and dried in a vacuum oven at 120° C. for 30 minutes to manufacture a positive electrode.

As a counter electrode, graphite, a conductive material (super P) and a binder (CMC) were mixed at a weight ratio of 95:1:4, and water was used as a solvent to manufacture a negative electrode mixture slurry. The negative electrode mixture slurry was coated onto a copper current collector and dried in a vacuum oven at 50° C. for 20 minutes to manufacture a negative electrode.

Using the respective components, a 2032 coin full-cell was manufactured according to a conventional manufacturing method.

Example 2

(1) Manufacture of Positive Electrode Additive

The positive electrode additive of Example 2 was obtained in the same manner as in Example 1, except that the heat treatment temperature was changed from 680° C. to 730° C.

(2) Manufacture of Positive Electrode and Lithium Rechargeable Battery (Coin Full-Cell)

The positive electrode and the lithium rechargeable battery of Example 2 were prepared in the same manner as in Example 1, except that the positive electrode additive of Example 2 was used instead of the positive electrode additive of Example 1.

Example 3

(1) Manufacture of Positive Electrode Additive

The positive electrode additive of Example 3 was obtained in the same manner as in Example 1, except that the heat treatment temperature was changed from 680° C. to 850° C.

(2) Manufacture of Positive Electrode and Lithium Rechargeable Battery (Coin Full-Cell)

The positive electrode and the lithium rechargeable battery of Example 3 were manufactured in the same manner as in Example 1, except that the positive electrode additive of Example 3 was used instead of the positive electrode additive of Example 1.

Example 4

(1) Manufacture of Positive Electrode Additive

The positive electrode additive was manufactured in the same manner as in Example 1

(2) Manufacture of Positive Electrode and Lithium Rechargeable Battery (Coin Full-Cell)

A positive electrode active material ($LiNi_{0.8}Co_{0.1}Mn_{0.1}O_2$), the positive electrode additive, a conductive material (Super-P, Denka Black) and a binder (PVdF) were mixed at a weight ratio of 88:9:2:1 (positive electrode active material: positive electrode additive: conductive material: binder) in an organic solvent (NMP) to manufacture a positive electrode mixture in a slurry form. Then, the positive electrode mixture was coated onto an aluminum current collector and dried in a vacuum oven at 120° C. for 30 minutes to manufacture a positive electrode.

As a counter electrode, graphite, a conductive material (super P) and a binder (CMC) were mixed at a weight ratio of 95:1:4, and water was used as a solvent to manufacture a negative electrode mixture slurry. The negative electrode mixture slurry was coated onto a copper current collector and dried in a vacuum oven at 50° C. for 20 minutes to manufacture a negative electrode.

Comparative Example 1

(1) Manufacture of Positive Electrode Additive

The positive electrode additive of Comparative Example 1 was manufactured in the same manner as in Example 1, except that the $N_2$ flow was changed from 2 L/min to 0.5 L/min.

(2) Manufacture of Positive Electrode and Lithium Rechargeable Battery (Coin Full-Cell)

The positive electrode and the lithium rechargeable battery of Comparative Example 1 were manufactured in the same manner as in Example 1, except that the positive electrode additive of Comparative Example 1 was used instead of the positive electrode additive of Example 1.

Comparative Example 2

(1) Manufacture of Positive Electrode Additive

The positive electrode additive of Comparative Example 2 was obtained in the same manner as in Example 1, except that the heat treatment temperature was changed from 680° C. to 920° C.

(2) Manufacture of Positive Electrode and Lithium Rechargeable Battery (Coin Full-Cell)

The positive electrode and the lithium rechargeable battery of Comparative Example 2 were manufactured in the same manner as in Example 1, except that the positive electrode additive of Comparative Example 2 was used instead of the positive electrode additive of Example 1.

Comparative Example 3

(1) Manufacture of Positive Electrode Additive $Li_2O$ and NiO were mixed at a molar ratio of 1:1, and then the mixture was heat-treated at 680° C. for 10 hours under the conditions where nitrogen gas, which is a kind of inert gas, was introduced at 2 L/min, thereby producing lithium nickel oxide.

After recovering the lithium nickel oxide, it was mixed with $NH_4H_2PO_4$. Here, $NH_4H_2PO_4$ was set to 5 wt % based on the total weight (100 wt %) of the mixture of the lithium nickel oxide and $NH_4H_2PO_4$. In addition, the mixing conditions used at this time were the same as those used when mixing the $Li_2O$ and NiO.

The mixture of the lithium nickel oxide and $NH_4H_2PO_4$ was heat-treated at 730° C. for 10 hours under the condition where a nitrogen gas as an inert gas were introduced at 2 L/min. Thereby, the positive electrode additive of Comparative Example 3 was obtained.

(2) Preparation of Positive Electrode and Lithium Rechargeable Battery (Coin Full-Cell)

The positive electrode and the lithium rechargeable battery of Comparative Example 3 were manufactured in the same manner as in Example 1, except that the positive electrode additive of Comparative Example 3 was used instead of the positive electrode additive of Example 1.

Experimental Example 1: Qualitative and Quantitative Analysis of the Positive Electrode Additive by XRD (X-Ray Diffraction)

XRD analysis of each of the positive electrode additives of Examples 1 to 3 and Comparative Examples 1 to 3 was performed by an X-ray diffraction analyzer (Bruker AXS D4-Endeavor XRD) using Cu Kα X-rays (X-rα).

The results of X-ray diffraction analysis of each of the positive electrode additives were qualitatively analyzed using Bruker's Evaluation program to confirm the corresponding peaks for $Li_2NiO_2$, $Li_3PO_4$, $Li_2O$ and NiO. For these corresponding peaks, quantitative analysis between two phases was performed by Rietveld refinement using TOPAS program (Bruker-AXS, TOPAS4, Karlsruhe, Germany). Rietveld refinement is a feedback process that repetitively adjusts the variables capable of using until the pattern calculated from each structural model of $Li_2NiO_2$, $Li_3PO_4$, $Li_2O$ and NiO matches best. In this process, not only the position of the diffraction peak, but also the intensity and intensity ratio of the peak were analyzed and the contents of the two phases were quantitatively analyzed (see, Rietveld, HML "Line Profiles of Neutron Powder-diffraction Peaks for Structure Refinement" Axta. Cryst., 22, 151-2, 1967 and Bish D L & Howard C J, "Quantitative phase analysis using the Rietveld method" J. Appl. Cryst., 21, 86-81, 1988).

The results of such XRD analysis were shown in Table 1 below. From this, it could be confirmed that Examples 1 to 3 and Comparative Examples 1 to 3 contained $Li_2NiO_2$, $Li_3PO_4$, $Li_2O$ and NiO.

However, referring to Table 1 below, it can be seen that collective mixing of the raw materials (the number of heat treatments), the heat treatment temperature, the supply state of the inert gas during the heat treatment, and the supply flow rate thereof have an influence on the mixing ratio of each component.

TABLE 1

| | Content of respective components based on the total content (100 wt %) of $Li_2NiO_2$, NiO, $Li_3PO_4$, and $Li_2O$ (unit: wt %) | | | |
| --- | --- | --- | --- | --- |
| | $Li_2NiO_2$ | NiO | $Li_3PO_4$ | $Li_2O$ |
| Example 1 | 81.8 | 13 | 3.1 | 2.1 |
| Example 2 | 85.2 | 10.7 | 2.9 | 1.2 |
| Example 3 | 84.9 | 10.1 | 2.8 | 2.2 |
| Comparative Example 1 | 86.4 | 10.8 | 2.8 | 0 |

TABLE 1-continued

| | Content of respective components based on the total content (100 wt %) of $Li_2NiO_2$, NiO, $Li_3PO_4$, and $Li_2O$ (unit: wt %) | | | |
| --- | --- | --- | --- | --- |
| | $Li_2NiO_2$ | NiO | $Li_3PO_4$ | $Li_2O$ |
| Comparative Example 2 | 64.5 | 21.5 | 2.5 | 2.5 |
| Comparative Example 3 | 76.7 | 13.4 | 3.1 | 6.9 |

According to Table 1, when the flow rate of the nitrogen gas supplied in the heat treatment process was less than 1.5 L/min (Comparative Example 1), $Li_2O$ was not detected at all.

In addition, when the heat treatment temperature exceeded 900° C. (Comparative Example 2), and when the mixture of $Li_2O$ and NiO was heat-treated to produce $Li_2NiO_2$, which was then separately mixed with $(NH_4)_2HPO_4$ and heat-treated (Comparative Example 3), the detection amount of $Li_2NiO_2$ was significantly reduced as compared with the Examples.

Figure 1:
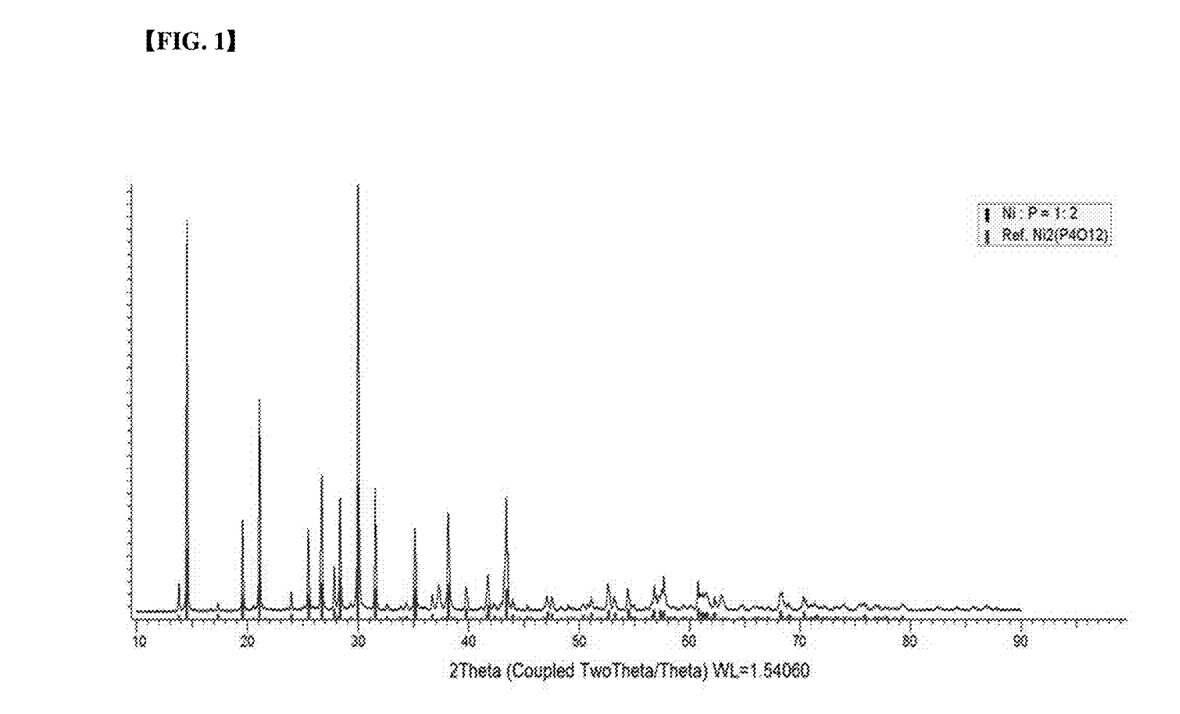
FIG. 1 is an XRD of $Ni_2P_4O_{12}$ separately synthesized in Experimental Example 1.

When the heat treatment temperature exceeds 900° C. in this way, or when the heat treatment is performed twice, $Li_2NiO_2$ may be decomposed and then re-synthesized, and the rate of return to $Li_2O$ without being disappeared or re-synthesized can be increased. Meanwhile, $Ni_2P_4O_{12}$ synthesized in Examples 1 to 3 is a trace amount, and thus, it was confirmed whether $Ni_2P_4O_{12}$ was synthesized by separately mixing only NiO and $(NH_4)_2HPO_4$ at a molar ratio of Ni:P=1:2 and heat-treating the mixture, rather than confirming the content in the final material.

The resulting material was subjected to XRD analysis by the same method as before, and the results are shown in FIG. 1.

According to FIG. 1, XRD peaks of the material made of the NiO and $(NH_4)_2HPO_4$ raw materials are observed at the same position as $Ni_2P_4O_{12}$. Thereby, even in the process of heat-treating the raw material mixture containing $Li_2O$, NiO, and $(NH_4)_2HPO_4$, (unreacted) NiO not participating in the production of $Li_2NiO_2$ can react with $(NH_4)_2HPO_4$. As a result, it is inferred that $Ni_2P_4O_{12}$ can be produced.

Further, since $Ni_2P_4O_{12}$ is a highly reactive compound due to an unstable structure, it was expected that the entire amount could be dissolved in the electrolyte and reduced to Ni on the surface of the negative electrode.

Experimental Example 2: Confirmation of the Presence of $Li_3PO_4$ in the Positive Electrode Additive by SEM (Scanning Electron Microscope) and EDS (Energy Dispersive X-ray Spectroscopy)

Figure 2A:
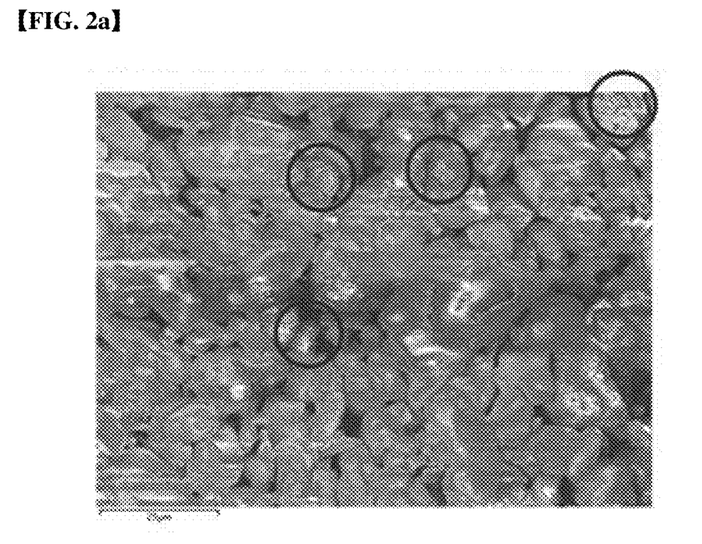
FIG. 2a is an FE-SEM image of the positive electrode active material of Example 1.

The surface of the positive electrode additive of Example 1 was photographed using a scanning electron microscope (FE-SEM) (JSM-7610F Schottky Field Emission Scanning Election Microscope), and the photographed image is shown in FIG. 2a.

In FIG. 2, the first phase secondary particle and the second phase particle (the part indicated by a circle in FIG. 2) attached to the surface were observed.

Among the components of the positive electrode additive analyzed in Table 1, the component present in the largest amount is $Li_2NiO_2$ and thus, it is determined that the first phase secondary particle is $Li_2NiO_2$.

Figure 2B:
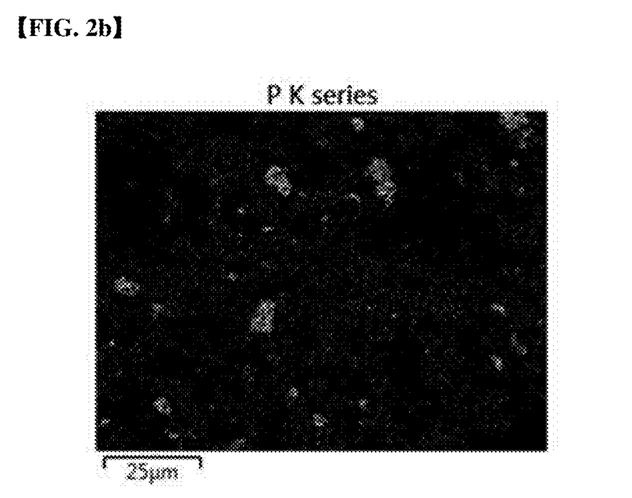

In order grasp the particle composition of the second phase, energy dispersive spectroscopy (EDS) (JSM-7610F Schottky Field Emission Scanning Election Microscope) was performed. As a result, element P was recognized at a position corresponding to the part shown in FIG. 2a. From this, it can be seen that the coating layer contains P.

it can be seen from Table 1 that among the components of the positive electrode additive analyzed, $Li_3PO_4$ is the only compound containing P and thus, the second phase particle is $Li_3PO_4$.

Figure 3A:
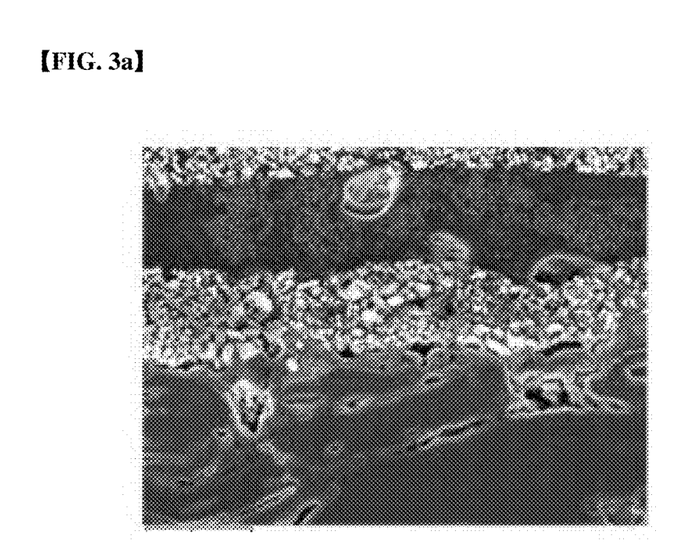
FIG. 3a is a SEM image of a negative electrode separated after the lithium rechargeable battery of Example 1 was charged once.
Figure 3B:
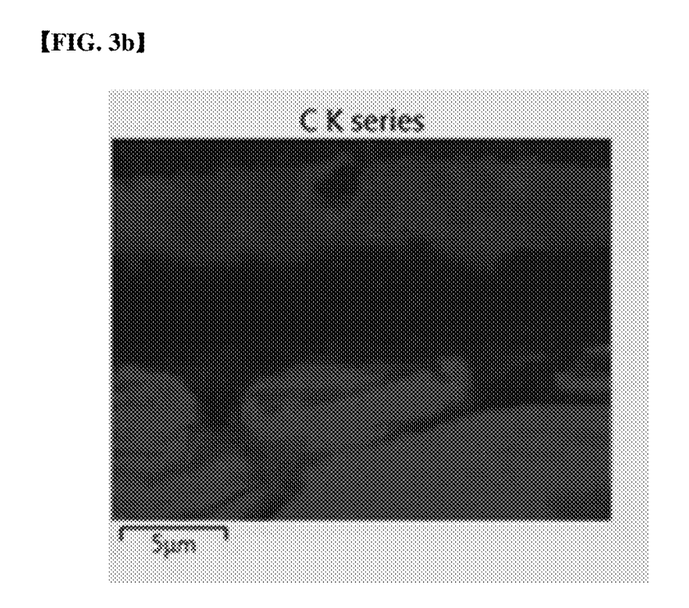

Of course, in the Examples, $Ni_2P_4O_{12}$ can also be synthesized, but it is regarded as $Ni_2P_4O_{12}$ since the amount is very small Experimental Example 3: Evaluation of Negative Electrode Surface Characteristics after Charge/Discharge of Lithium Rechargeable Battery The lithium rechargeable battery of Example 1 was charged once at 25° C. under the following conditions, and then the negative electrode was separated. SEM (Scanning Electron Microscope) and EDS (Energy Dispersive X-ray Spectroscopy) analysis of the negative electrode surface was performed.

Charge: 0.2 C, CC/CV, 4.2V, 0.05 C cut-off

Figure 3C:
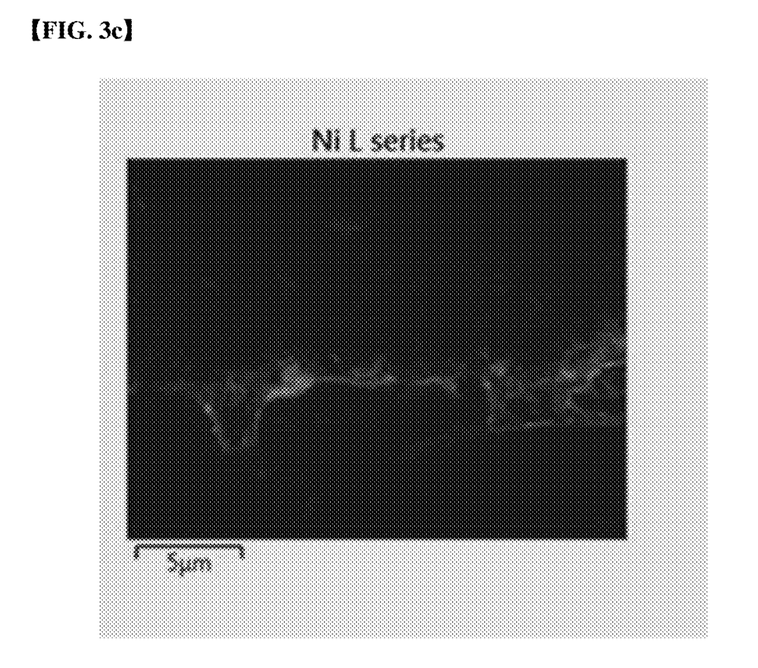

According to the SEM image of FIG. 3a, the film was observed on the surface of the negative electrode separated from the lithium rechargeable battery of Example 1 after charging once. As a result of EDS analysis of the corresponding portion, it is confirmed that the main component of the film is Ni (FIG. 3c). This is inferred to be because $Ni_2P_4O_{12}$ contained in the positive electrode additive of Example 1 is dissolved in the electrolyte, and then reduced on the surface of the negative electrode to form a Ni metal layer.

In addition, inductively coupled plasma (ICP) analysis was performed for Examples 1 to 4 and Comparative Examples 1 to 6, and the results are shown in Table 2 below.

TABLE 2

|  | Result of ICP analysis: Detection amount of Ni (unit: ppm) |
| --- | --- |
| Example 1 | 3378 |
| Example 2 | 3780 |
| Example 3 | 3570 |
| Example 4 | 165 |
| Comparative Example 1 | 15 |
| Comparative Example 2 | 5 |
| Comparative Example 3 | 10 |

As shown in Table 2, it is confirmed that the amount of Ni reduction in Examples 1 to 3 is significantly excessive as compared with Comparative Examples 1 to 3.

In the case of Examples 1 to 3, (unreacted) NiO not participating in the formation reaction of $Li_2NiO_2$ may react with the $(NH_4)_2HPO_4$, and as a result, it is inferred that $Ni_2P_4O_{12}$ can be produced. Further, it is inferred that since $Ni_2P_4O_{12}$ is a highly reactive compound due to its unstable structure, the whole amount may be dissolved in the electrolyte and reduced to Ni on the surface of the negative electrode.

On the other hand, the reaction temperature itself of Comparative Example 1 is included in the range of Examples 1 to 3, but as the supply flow rate of the inert gas was lowered to less than 1.5 L/min, $Ni_2P_4O_{12}$ was not produced, and such an additive not containing $Ni_2P_4O_{12}$ would not been able to form a Ni metal layer on the surface of the negative electrode.

Further, when the heat treatment temperature exceeds 900° C. (Comparative Example 2), and when a mixture of $Li_2O$ and NiO was heat-treated to produce $Li_2NiO_2$ which was separately mixed with $(NH_4)_2HPO_4$ and heat-treated (Comparative Example 3), structurally unstable $Li_2NiO_2$ was decomposed under the heat treatment conditions and then re-synthesized, and $Ni_2P_4O_{12}$ would not have been produced in that process.

However, Ni detected in Comparative Examples 1 to 3 is inferred from the result that a very small amount of NiO is eluted from the positive electrode additive.

Experimental Example 4: Evaluation of Capacity Maintenance Rate according to Charging and Discharging of Lithium Rechargeable Battery For each lithium rechargeable batteries of Examples 1 and 3 and Comparative Examples 1 and 3, 50 cycle charge/discharge were performed at 25° C. under the following conditions. After the completion of the 50th cycle compared to the initial (1st cycle) discharge capacity of each battery, the discharge capacity was evaluated, and the results are shown in FIG. 4.

Figure 4:
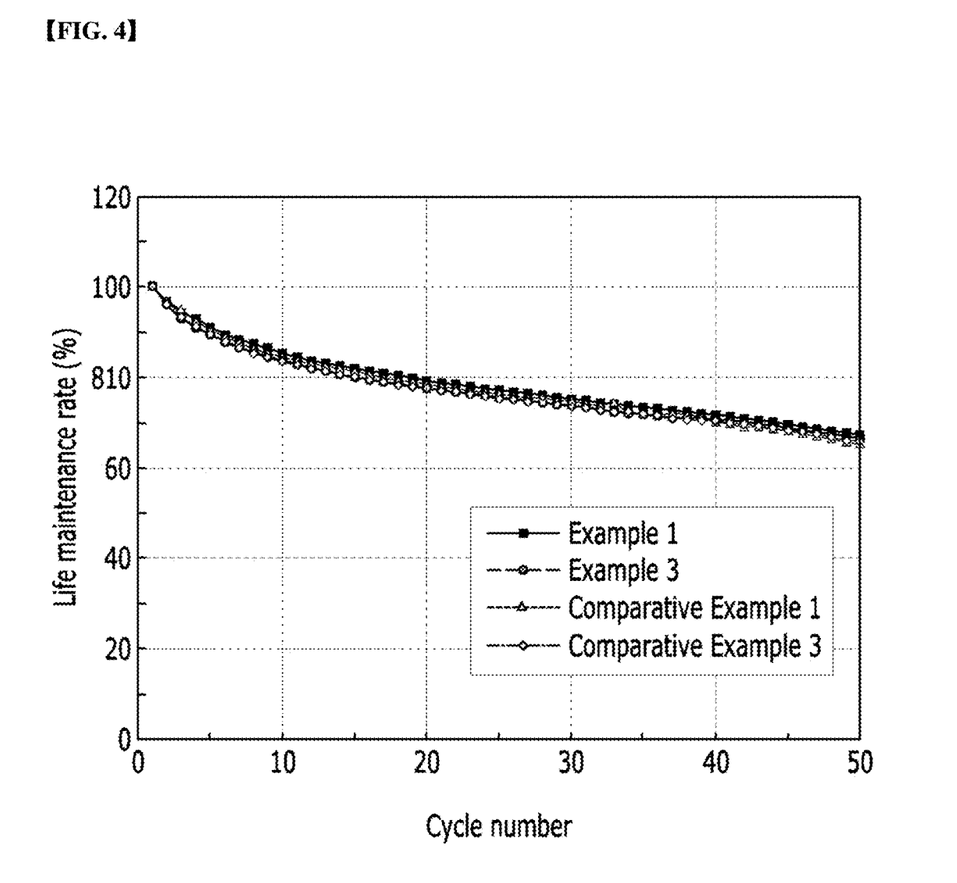
FIG. 4 shows the results of evaluation of the capacity (life) maintenance rate according to charge and discharge of each lithium rechargeable battery of Examples 1 and 3 and Comparative Examples 1 and 3.

Charge: 0.2 C, CC/CV, 4.25V, 0.05 C cut-off
Discharge: 0.2 C, CC, 2.5 V, cut-off From FIG. 4, it can be seen that the Ni metal layers formed on the surfaces of the negative electrodes of Examples 1 and 3 do not inhibit the electrochemical properties of the battery, but allow the capacity of Comparative Examples 1 and 3 to maintain at the same cycle.

INDUSTRIAL APPLICABILITY

The lithium ion battery to which the positive electrode additive of the one embodiment is applied suppresses gas generation and can be stably driven while effective offsetting initial irreversible capacities of the positive electrode and the negative electrode.

The invention claimed is:

1. A positive electrode additive for a lithium rechargeable battery comprising:
   a compound represented by the following Chemical Formula 1;
   a compound represented by the following Chemical Formula 2; and
   lithium phosphate ($Li_3PO_4$)

$$Li_{2+a}Ni_bM_{1-b}O_{2+c}$$ [Chemical Formula 1]

wherein, M is a metal element forming a divalent cation, $-0.2 \leq a \leq 0.2$, $0.5 \leq b \leq 1.0$, and $-0.2 \leq c \leq 0.2$, $$Ni_{2-e}M_{1-e}P_4O_{12}$$ [Chemical Formula 2]

wherein, $0.5 < e < 1.0$, and M is the same as defined in Chemical Formula 1,
   wherein the compound represented by Chemical Formula 1 is included in an amount of 80 to 90% by weight, and the $Li_3PO_4$ is included in an amount of 2 to 5% by weight, each based on the total amount (100% by weight) of the positive electrode additive.

2. The positive electrode additive for a lithium rechargeable battery according to claim 1,
   wherein the compound represented by Chemical Formula 2 is dissolved in an electrolyte containing a lithium salt and an organic solvent.

3. The positive electrode additive for a lithium rechargeable battery according to claim 1,
   wherein in the positive electrode additive, the compound represented by Chemical Formula 1 forms a secondary particle, and the lithium phosphate particle is attached to the surface of the secondary particle.

4. The positive electrode additive for a lithium rechargeable battery according to claim 1,
wherein the positive electrode additive further comprises Li$_2$O and NiO.

5. A method for manufacturing the positive electrode additive for a lithium rechargeable battery according to any one of claims 1 to 4, comprising the steps of:
preparing a raw material mixture containing a lithium raw material, a nickel raw material, and a phosphorus raw material; and
heat-treating the raw material mixture at a temperature in the range of 600 to 900° C. in a reactor into which an inert gas is supplied at a flow rate of 1.5 to 2.5 L/min.

6. The method for manufacturing a positive electrode additive for a lithium rechargeable battery according to claim 5,
wherein the inert gas includes nitrogen (N$_2$) gas.

7. The method for manufacturing a positive electrode additive for a lithium rechargeable battery according to claim 5,
wherein in the raw material mixture, a molar ratio of lithium (Li): nickel (Ni) constituting the lithium raw material and the nickel raw is 3:1 to 3:2.

8. The method for manufacturing a positive electrode additive for a lithium rechargeable battery according to claim 5,
wherein the phosphorus raw material is contained in an amount of 1 to 10% by weight based on the total amount (100% by weight) of the raw material mixture.

9. The method for manufacturing a positive electrode additive for a lithium rechargeable battery according to claim 5,
wherein the phosphorus raw material includes secondary ammonium phosphate ((NH$_4$)$_2$HPO$_4$), primary ammonium phosphate (NH$_4$H$_2$PO$_4$), or a mixture thereof.

10. The method for manufacturing a positive electrode additive for a lithium rechargeable battery according to claim 5,
wherein the step of heat-treating the raw material mixture at a temperature in the range of 600 to 900° C. in a reactor to which an inert gas is supplied, comprises the following steps:
a) reacting the lithium raw material and the nickel raw material to produce a compound represented by the following Chemical Formula 1;
b) reacting the nickel raw material that has not reacted in step a) with the phosphorous raw material to produce a compound represented by the following Chemical Formula 2;
c) reacting the lithium raw material that has not reacted in step a) with the phosphorus raw material that has not reacted in step b) to produce lithium phosphate (Li$_3$PO$_4$); and
d) obtaining a positive electrode additive including the compound represented by Chemical Formula 1 produced in step a), the compound represented by Chemical Formula 2 produced in step b), and the lithium phosphate (Li$_3$PO$_4$) produced in step c), $$Li_{2+a}Ni_bM_{1-b}O_{2+c} \quad \text{[Chemical Formula 1]}$$

wherein, M is a metal element forming a divalent cation, −0.25≤a≤0.2, 0.5≤b≤1.0 and −0.2≤c≤0.2, $$Ni_{2-e}M_{1-e}P_4O_{12} \quad \text{[Chemical Formula 2]}$$

wherein, 0.5≤e≤1.0, and M is the same as defined in Chemical Formula 1.

11. The method for manufacturing a positive electrode additive for a lithium rechargeable battery according to claim 10,
wherein the positive electrode additive obtained in step d) also includes a lithium raw material, a nickel raw material, or a mixture thereof which are not reacted in a) to c).

12. A lithium rechargeable battery comprising:
a positive electrode containing the positive electrode additive of claim 1;
an electrolyte containing a lithium salt and an organic solvent; and
a negative electrode.

13. The lithium rechargeable battery according to claim 12,
wherein during charging formation of the lithium rechargeable battery,
the compound represented by Chemical Formula 2 is eluted from the positive electrode additive, and then reduced to Ni metal on the surface of the negative electrode.

14. The lithium rechargeable battery according to claim 12,
wherein 200 to 4000 ppm of Ni metal is detected from the surface of the negative electrode separated after the lithium rechargeable battery is formed and charged up to 4.2 V.

* * * * *